US007317162B2

(12) United States Patent
Kaady

(10) Patent No.: US 7,317,162 B2
(45) Date of Patent: Jan. 8, 2008

(54) PROTECTIVE HOUSING FOR POWER CORD CONNECTION

(76) Inventor: John Randall Kaady, 19900 SE. Fairway Dr., Boring, OR (US) 97009

( * ) Notice: Subject to any disclaimer, the term of this patent is extended or adjusted under 35 U.S.C. 154(b) by 0 days.

(21) Appl. No.: 11/370,629

(22) Filed: Mar. 7, 2006

(65) Prior Publication Data

US 2007/0209822 A1 Sep. 13, 2007

(51) Int. Cl.
*H02G 15/08* (2006.01)

(52) U.S. Cl. ........................................................ 174/91

(58) Field of Classification Search .................. 174/91, 174/92, 138 F See application file for complete search history.

(56) References Cited

U.S. PATENT DOCUMENTS

| | | | | |
|---|---|---|---|---|
| 585,707 | A | | 7/1897 | Schwedtmann |
| 3,048,810 | A | | 8/1962 | Steen |
| 3,059,209 | A | | 10/1962 | Bird |
| 3,147,338 | A | * | 9/1964 | Ekvall et al. ............ 174/138 F |
| 3,278,674 | A | | 10/1966 | Matthysse |
| 3,519,731 | A | | 7/1970 | Grunbaum et al. |
| 3,639,678 | A | * | 2/1972 | Muschong .................. 174/145 |
| 4,927,377 | A | | 5/1990 | Bach et al. |
| 5,217,387 | A | | 6/1993 | Hull et al. |
| 5,259,782 | A | | 11/1993 | Giffin |
| 5,306,176 | A | | 4/1994 | Coffey |
| 5,443,397 | A | | 8/1995 | Carl |
| 5,755,588 | A | | 5/1998 | Sweatman et al. |
| D407,377 | S | | 3/1999 | Landerholm et al. |
| 5,913,692 | A | | 6/1999 | Targett |
| 6,099,340 | A | | 8/2000 | Florentine |
| 6,149,445 | A | | 11/2000 | Daddono |
| 6,250,946 | B1 | | 6/2001 | Tardy |
| D464,325 | S | | 10/2002 | Peters et al. |
| 2004/0097120 | A1 | | 5/2004 | Limber et al. |

FOREIGN PATENT DOCUMENTS

| | | | |
|---|---|---|---|
| JP | 06-181019 | * | 6/1994 |

* cited by examiner

*Primary Examiner*—Chau N. Nguyen
(74) *Attorney, Agent, or Firm*—Chernoff Vilhauer McClunt & Stenzel, LLP

(57) ABSTRACT

A protective housing for electrical connections has a base and a selectively removable cover defining a chamber between the cover and the base. The cover includes a plurality of openings, which provide for passage of electrical cords and permit liquid to drain from the chamber. Electrical connections rest upon a raised area of the base that serves as a floor for the chamber. The floor is sloped from a raised central area towards the edges of the floor to drain liquid out of the chamber. The cover and the base form an interference fit and a flush seam located below the platform. The openings are generally located at the seam so that they may serve as the passageway through which water and debris exit the chamber. The housing is made of material that floats in liquid to maximize protection of the electrical components.

27 Claims, 2 Drawing Sheets

PROTECTIVE HOUSING FOR POWER CORD CONNECTION

BACKGROUND OF THE INVENTION

1. Field of the Invention

The present invention relates to the field of electrical safety devices in general, and in particular to a housing for protecting outdoor electrical connections or electrical components from direct exposure to the weather.

2. Description of Related Art

Electrical connections between power cords and Extension cords are often exposed to the weather on outdoor construction sites or when outdoor lights are displayed. When an electrical connection or component is exposed to rain or snow, or rests in standing water, the water can act as an alternate pathway through which the electricity may flow. For example, electrical current will flow through water rather than the intended circuit if the water presents lower resistance than the circuit. This condition can permanently damage the circuits, trip circuit breakers, present a safety hazard, and cause other electrical disruptions.

To address this problem, protective housings have been developed to shield the electrical connections. These housings typically attempt to prevent water from entering the chamber in which the electrical connections and components sit. In many cases, liquid will leak into the chamber in some amount and be retained in the housing, which damages or degrades the electrical circuit.

Attempts to address these problems are shown in U.S. Pat. Nos. 5,217,387, 5,306,176, 6,099,340, and U.S. patent application No. US 2004/0097120. Protective housings such as disclosed in Hull U.S. Pat. No. 5,217,387, Coffey U.S. Pat. No. 5,306,176, Florentine U.S. Pat. No. 6,099,340, and Limber U.S. patent application No. US 2004/0097120 attempt to provide waterproof seals where the electrical cords enter the protective housing to prevent water from entering the chamber and contacting the electrical connections/components. However, even with the greatest efforts to keep it out, liquid often does enter the chamber and damages the electrical components despite the waterproof seal.

The present invention provides a housing that shields the electrical connections/components from direct exposure to the weather and encourages any water that enters the housing to drain from the portion of the housing containing the electrical components/connections. Features and advantages of the present invention will be more readily understood upon consideration of the following detailed description of the invention taken in conjunction with the accompanying drawings.

DETAILED DESCRIPTION OF PREFERRED EMBODIMENT

Figure 1:
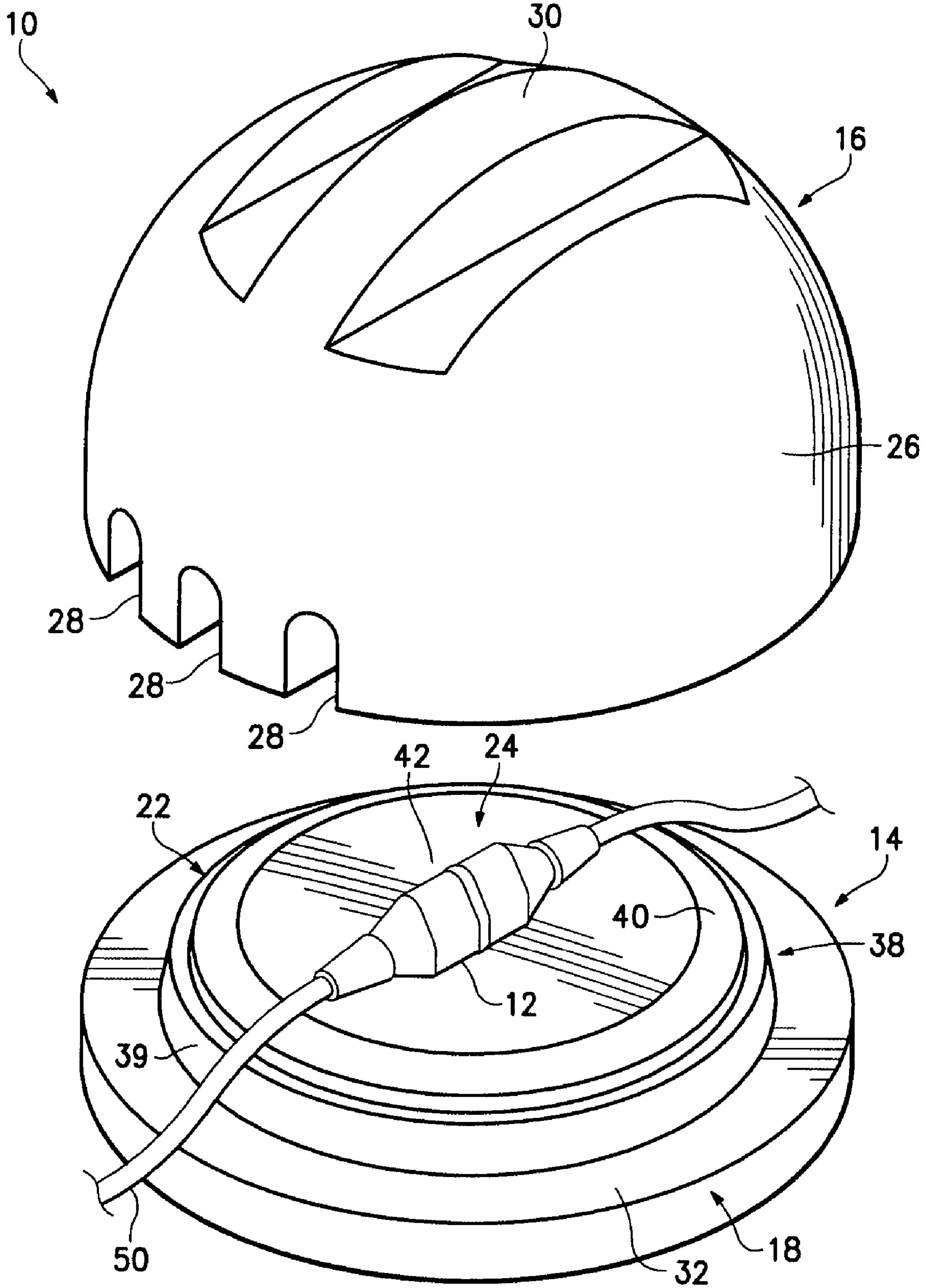
FIG. 1 is an exploded isometric view of a protective housing for electrical components including a base capable of shedding liquid away from the electrical components and a cover, which is an exemplary embodiment of the present invention.

Referring to the drawings, which are a part of the disclosure herein, an exemplary protective housing 10 for electrical connections or components 12, (hereinafter referred to as merely "connections") is shown in FIG. 1. The housing 10 includes a base 14 and a cover 16. The base 14 includes a lower portion 18, having a bottom surface 20, an upper portion 22, and an upper surface 24. The cover 16 includes an outer surface 26, preferably waterproof, capable of shedding liquid such as water. The cover 16 also includes one or more openings 28 and a gripping portion 30 which can serve as a handle for gripping the cover 16.

In the exemplary embodiment, the base 14 is generally circular, but the invention described and claimed is not limited to a circular base. The lower portion 18 of the base includes an annular seat 32 adapted to receive the mating bottom edge 36 of the cover walls 34 and supports the edge of the cover at a position above the bottom surface 20 of the base 14. In the exemplary embodiment, the upper portion 22 of the base 14 is generally defined by the annular seat 32, such that the upper portion 22 is shielded from precipitation or other liquid and debris by the cover 16 when the bottom edge 36 of the cover 34 is engaged with the annular seat 32 of the base 14.

In the exemplary embodiment, the upper portion 22 of the base 14 includes one or more steps 38, at least one of which is sloped away from the upper surface 24 of the base 14. As will be explained in further detail, the upper surface 24 serves as a platform for the electrical connections 12 and as a floor of the chamber 40 defined by the base 14 and the cover 16. In the exemplary embodiment, a bottom step 39, is nearly vertical and dimensioned appropriately with respect to the dimensions of the bottom edge 36 of the cover walls 34 to create an interference fit between the cover 16 and the base 14, eliminating the need for a fastening element to retain the cover 16 together with the base 14. A top step 40 arranged circumferentially within the bottom step 39, includes an outwardly sloping portion adapted to provide a sloping surface that drains water or other liquid and debris away from the upper surface 24 of the base.

The upper surface 24 includes a raised area 42 which is somewhat above the level of the peripheral edges of the upper surface 24 when the base 14 is resting substantially flat on a supporting surface 44. In the exemplary embodiment, the raised area 42 is generally located in the central portion 46 of the upper surface 24. Thus liquid and debris, which may come to be on the raised area 42 of the upper surface 24 will not rest there, but instead migrate toward a peripheral edge of the upper surface 24, or in the circular model of the exemplary embodiment, toward the circumference of the upper surface 24. Once reaching the edge of the upper surface 24, the liquid and debris will fall down the steps (39, 40), and, as will be explained below, drain out of the protective housing 10.

In the exemplary embodiment, the base 14 is made of a material capable of floating in liquid so that it may further protect the electrical connections 12 from resting in standing liquid. For example, the base 14 could be made of semi-rigid floatable foam, but the invention described and claimed is not limited to floatable foam as the material for the base 14. In the exemplary embodiment, the material of the invention has a specific gravity less than one so it is capable of floating in pure water.

Referring again to FIG. 1, the cover 16 is a dome-shape in the exemplary embodiment, although it will be understood that the cover 16 may be any shape that would cover the upper surface 24 of the base 16. Preferably, the shape of the cover 16 is adapted to shed liquid from the protective housing 10. In the exemplary embodiment, the dome shape of the cover 16 additionally serves to withstand greater force from objects falling or pressing down upon it and because of its rounded surface area it is capable of dispersing weight better than other shapes.

In the exemplary embodiment, openings 28 in the cover 16 serve as entrances through which power cords 50 of the electrical connections 12 may be allowed to enter the chamber 52. In the exemplary embodiment shown in FIG. 3, a pair of openings 28 is located substantially opposite each other, at substantially similar heights with respect to the base 14. To allow for easy access to the chamber 52 for the cords 50, the openings 48 are located at the seam 54 where the cover 16 and the base 14 mate with each other. Additional openings 28 may be used as desired to accommodate multiple sets of cords 50, although it will be understood that openings 28 need not be present in pairs, nor must they be at substantially similar heights.

In the exemplary embodiment, the openings 28 form a passageway 48. The sloped roof of the passageway 48 provides an eave effect to discourage liquid and debris from blowing into the chamber 52. The sloped floor 56 encourages the liquid and debris to flow out of the housing's openings 28.

The bottom edge 36 of the cover walls 34, has an interior wall 58 sized to create an interference fit between the base 14 and the cover 16. A circumferential channel 60 is formed between the interior wall 58 of the cover 16 and the steps 38. This channel 60 directs liquid to the passageways 48 to flow out of the chamber 52. In the exemplary embodiment, the lower portion of the openings 28 are located below the channel 60 so that the liquid in the channel 60 will drain out of the openings 28.

In the exemplary embodiment, the cover 16 includes a gripping portion 30 for use as a handle to enable a user to remove the cover 16 and easily access the chamber 52. The gripping portion 30 may be in the form of a handle attached to the cover 16, a shape cut out of the cover 16 to serve as a handle, or a rough surface capable of providing enough friction to allow a user to open the chamber 52 with ease. It will be understood that any form of gripping portion may be used that allows the user to easily access the chamber 52.

Figure 2:
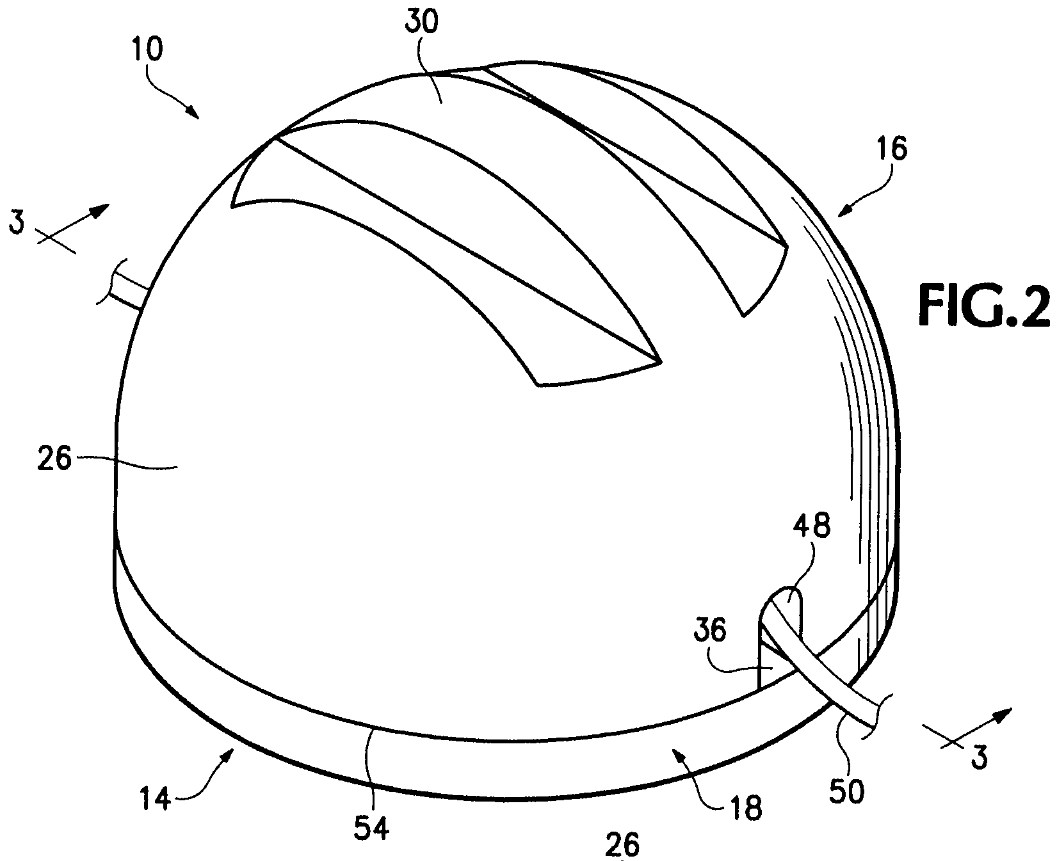
FIG. 2 is an isometric view of the protective housing completely functional with the cover fitting tightly over the base to provide the electrical components with a protective chamber.

Referring to FIG. 2, the cover 16 is shown fitted together with the base 14 of the protective housing 10. In the exemplary embodiment, the cover 16 and base 14 create a flush seam 54 between the two pieces when they are fit together. The seam 54 between the cover 16 and the base 14 helps prevent liquid from entering the chamber 52 because the interference fit creates a seal in the exemplary embodiment. Any water that breaches the seal will flow through the channel 60 to a passageway 48 and out of the housing 10. The passageways 48 provide sheltered access directly into the chamber 52 for the cords 50.

Figure 3:
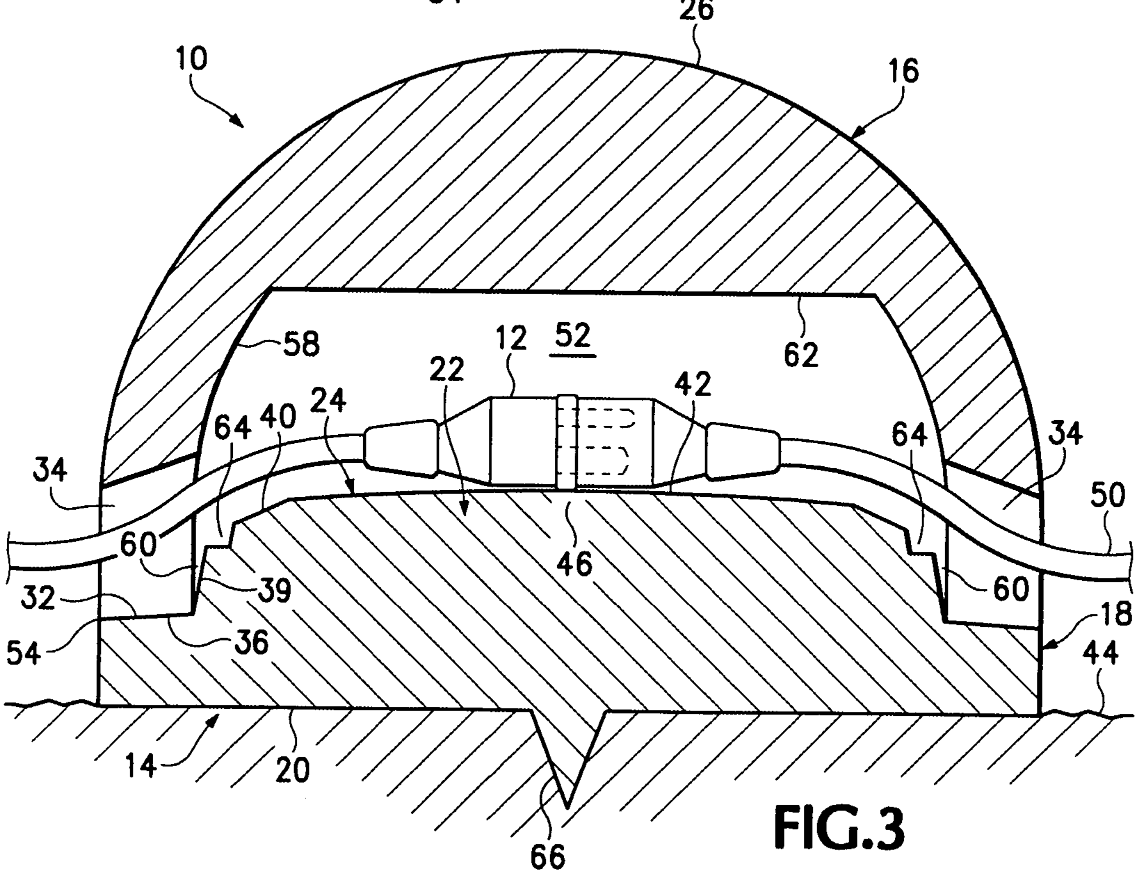
FIG. 3 is a sectional view of the protective housing with the electrical components shown to be contained within the chamber, taken along line 3-3 in FIG. 2.

Referring again to FIG. 3, the electrical connections 12 are shown resting on the upper surface 24 of the base 14 within the enclosed chamber 52. The cords 50 are shown to exit the chamber 52 through two opposed openings 28. As shown in FIG. 3, the steps 38 of the upper portion 22 of the base enable the cords 50 of the electrical connection 12 to enter/exit the housing 10 without undue bending. In the exemplary embodiment, a ceiling 62 of the chamber 52 is flat rather than dome-shaped and forms a space within the chamber 52 in which the electrical components 12 are protected. The additional material contributes to the strength of the cover 16 and provides material with which to fashion a gripping portion 30. However, the invention is not limited to a chamber with a flat ceiling.

Referring again to FIG. 3, the channel 60 and sloped upper surface 22 of the base enables dirt, debris, and liquid to move off the chamber floor and assists in draining liquid out of the chamber 52. In the exemplary embodiment, the channel 60 serves as a drain 64 to permit liquid and debris to migrate from the chamber 52 to the exterior of the protective housing 10. In the exemplary embodiment, the channel 60 created by the interference fit prevents debris or liquid from resting at the passageways 48. The cover 16 and base 14 may be sealed by other fasteners than the interference fit, such as an external latch or Velcro®; however, the presence of the interference fit in the exemplary embodiment reduces the overall complexity of the protective housing 10. The base 14 may include or cooperate with an anchor 66 or other device to secure the housing 10 to the supporting surface 44.

The electrical connections 12 rest in a position above the regions of the base 14 that may collect liquid. For example, as shown in the exemplary embodiment in FIG. 3, the connections 12 are placed on a raised portion 42 of the circular surface 24. It will be understood that many other shapes and locations of the electrical connections 12 will achieve a similar goal of draining liquid and debris from the portion of the chamber 52 that holds the connections 12.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A self-draining protective housing for shielding electrical components comprising:

(a) a base;

(b) a cover positioned above said base, said cover including an upright wall section;

(c) a chamber located between said base and said cover; and (d) a first drain extending from said chamber through said upright wall section to outside of said housing, wherein said chamber includes a floor and said base includes a bottom surface, and at least a portion of said first drain is located below the level of said floor and above said bottom surface of said base.

2. A self-draining protective housing for shielding electrical components comprising:

(a) a base;

(b) a cover engaging said base, said cover including an upright wall section;

(c) a chamber located between said base and said cover; and (d) a first drain extending from said chamber through said upright wall section to outside of said housing, said first drain sloping downwardly and outwardly from said chamber.

3. The protective housing of claim 2 wherein said cover is not of the same piece of material as said base.

4. The protective housing of claim 2 wherein said cover is substantially impervious to liquid.

5. The protective housing of claim 2 wherein at least said base is capable of floating in liquid.

6. The protective housing of claim 2 wherein at least said base has a specific gravity less than 1.

7. The protective housing of claim 2 wherein said chamber includes a floor, said base and said cover defining said first drain therebetween, said first drain sloping downwardly away from said floor.

8. The housing of claim 7 including a first opening in said upright side wall section where said first drain passes through said upright side wall, at least a portion of said first opening situated below the level of said floor.

9. The protective housing of claim 2 wherein said housing includes a gripping portion.

10. The protective housing of claim 2 wherein said base accommodates an anchor capable of securing said housing to a supporting surface.

11. The protective housing of claim 2 wherein said cover is retained on said base by an interference fit between said cover and said base.

12. The protective housing of claim 2 wherein said first drain is sized to accommodate electrical cords.

13. The protective housing of claim 2 wherein said cover includes a handle for allowing a user to move said cover with respect to said base and obtain access to said chamber.

14. The protective housing of claim 2 including a plurality of drains.

15. The protective housing of claim 2 including a second drain located substantially opposite said first drain.

16. The housing of claim 15 wherein said second drain provides a passage through said cover for electrical power cords.

17. The housing of claim 2 wherein a lower portion of said base extends below said cover.

18. The housing of claim 17 wherein said first drain extends through said upright wall section above said lower portion of said base.

19. The housing of claim 2 wherein said first drain has a stepped floor and a sloping roof.

20. The housing of claim 19 wherein said roof of said first drain slopes downwardly and outwardly from said chamber.

21. The housing of claim 2 wherein said first drain provides a passage through said cover for electrical power cords.

22. A method for protecting an outdoor electrical power cord connection from exposure to the elements comprising:

(a) providing a protective housing including a base and a removable cover, said cover having an upright wall section, said base and said cover defining a chamber having a floor;

(b) providing a first passageway in said housing from said chamber to outside of said housing, said first passageway extending through said upright wall section of said cover, said first passageway arranged such that it slopes downwardly from said floor enabling water to drain off said floor through said first passageway;

(c) placing said base upon a supporting surface with said floor uppermost;

(d) creating a first electrical connection between a first power cord and a second power cord;

(e) placing said first electrical connection on said floor of said protective housing; and (f) placing said cover over said base such that said cover is above said first electrical connection and said first power cord passes through said first passageway.

23. The method of claim 22 including arranging said second power cord to pass through said first passageway.

24. The method of claim 22 including providing a second passageway from said chamber to outside of said housing and arranging said second power cord to pass through said second passageway.

25. The method claim 24 including causing said second passageway to pass through said upright wall section.

26. The method of claim 24 including causing said second passageway to slope downwardly from said floor enabling water to drain off said floor through said second passageway.

27. The method of claim 24 including locating said second passageway substantially opposite said first passageway.

* * * * *